March 24, 1964  P. DORNIER  3,126,170
AIRCRAFT FOR SELECTIVE FORWARD AND VERTICAL START
Filed July 10, 1962  3 Sheets-Sheet 1

Inventor:
PETER DORNIER
by K. A. Mayr
Attorney

March 24, 1964 P. DORNIER 3,126,170
AIRCRAFT FOR SELECTIVE FORWARD AND VERTICAL START
Filed July 10, 1962 3 Sheets-Sheet 2

Inventor:
PETER DORNIER
by H.B. Mayr
Attorney

March 24, 1964     P. DORNIER     3,126,170
AIRCRAFT FOR SELECTIVE FORWARD AND VERTICAL START
Filed July 10, 1962     3 Sheets-Sheet 3

Inventor:
PETER DORNIER
by K. A. Mayr
Attorney

United States Patent Office 3,126,170
Patented Mar. 24, 1964

3,126,170
AIRCRAFT FOR SELECTIVE FORWARD AND VERTICAL START
Peter Dornier, Friedrichshafen, Germany, assignor to Dornier-Werke G.m.b.H., Friedrichshafen, Germany, a firm of Germany
Filed July 10, 1962, Ser. No. 208,694
7 Claims. (Cl. 244—12)

This invention relates to an airplane suitable for selectively starting in forward direction, inclined, or vertical direction without appreciable change of the position of the longitudinal axis of the airplane.

Airplanes are known suitable for starting in inclined or vertical direction whereby the longitudinal axis of the airplane is inclined or vertical and must be turned to assume a horizontal position for forward flight. These airplanes are, therefore, badly suitable for transporting passengers and heavy loads.

Jet propelled airplanes are known suitable for starting in inclined or vertical direction whereby lifting jet power plants are mounted in the fuselage or in the wings. These power plants are not required during normal forward flight and constitute an undesired dead load during forward flight. This arrangement is not economic. Additional and different long-life jet power plants must be provided for forward flight, which plants are located in or on either side of the fuselage near the stern, or are mounted on the wings. The lifting jet power plants may be of the relatively short-life type. They are small and numerous. Because of the great number of power plants of different construction an airplane of this type is expensive with respect to first cost as well as to upkeep.

Jet propelled airplanes are known suitable for starting in inclined or vertical direction whereby the same power plants are used for vertical as well as horizontal flight. In this case the entire power plants are tiltable or are provided with tiltable nozzles. Such power plant arrangement is less heavy than the aforedescribed arrangements but is complicated because of the required tilting provisions. It also involves aeronautical difficulties when changing from vertical to horizontal flight and conversely. If the airplane is of the low wing type, as is customary for this type of airplane, the thrust resultant does not extend through the horizontal transverse line including the center of gravity of the airplane, when the direction of the jets is changed. One stream or two-stream power plants have been proposed for this type of arrangement, the two-stream power plants producing a cold stream of compressed air and a hot stream of combustion gas.

If the power plants or their nozzles are mounted near the tips of the wings a positive ground effect is produced which assists lifting of the airplane from the ground, when the nozzles are in a position for discharge in downward direction. The ground effect is present only as long as the aircraft is close to the ground and the pilot may be misled as to the really available thrust. If the power plants are placed in or near the fuselage a negative ground effect occurs beneath the wings which reduces the lifting power.

Various combinations of the aforedescribed arrangements have been proposed.

It is an object of the present invention to provide a transport plane suitable for forward start under the civil aeronautic safety conditions as well as for inclined and vertical start, which airplane overcomes the difficulties experienced with conventional airplanes suitable for forward, inclined and vertical start.

A further object of the invention resides in the provision of a jet propelled transport plane suitable for forward, inclined and vertical start wherein the jet power plants are so far spaced from the ground that damage to the runway by the exhaust air or gas is avoided.

Another object of the invention is the provision of a jet propelled airplane suitable for forward, inclined and vertical start whereby the thrust resultant of all jets at any operative jet direction extends through or at least close to the horizontal transverse line containing the center of gravity of the airplane.

The airplane according to the invention is of the conventional mid-wing monoplane type whereby the wings are mounted to the top portion of the fuselage substantially at the center thereof. Conventional jet engines are arranged below the wings laterally of and spaced from the fuselage which is therefore easily accessible and suitable for receiving heavy pay load. The engines or their nozzles are continuousuly tiltable through almost 180° and are capable of developing sufficient thrust for vertical take-off. They are far above the ground and placed in such position relative to the center of gravity of the airplane that in any position of the nozzles the resultant of the thrust produced by the jets of each engine extends substantially through the lateral axis of the airplane.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Like parts are designated by like numerals in the several figures and only parts are shown which are needed for explaining the invention.

Figure 1:
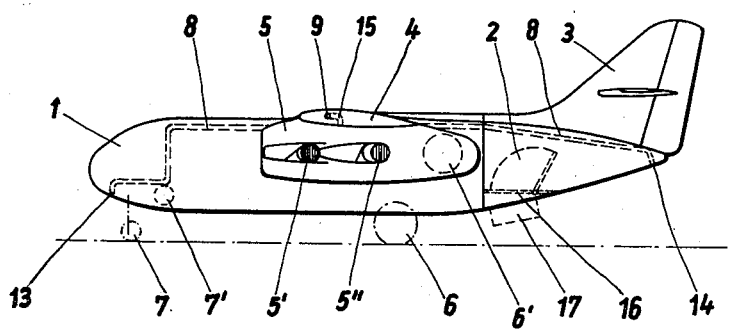
FIG. 1 is a schematic side elevation of an airplane according to the invention.
Figure 2:
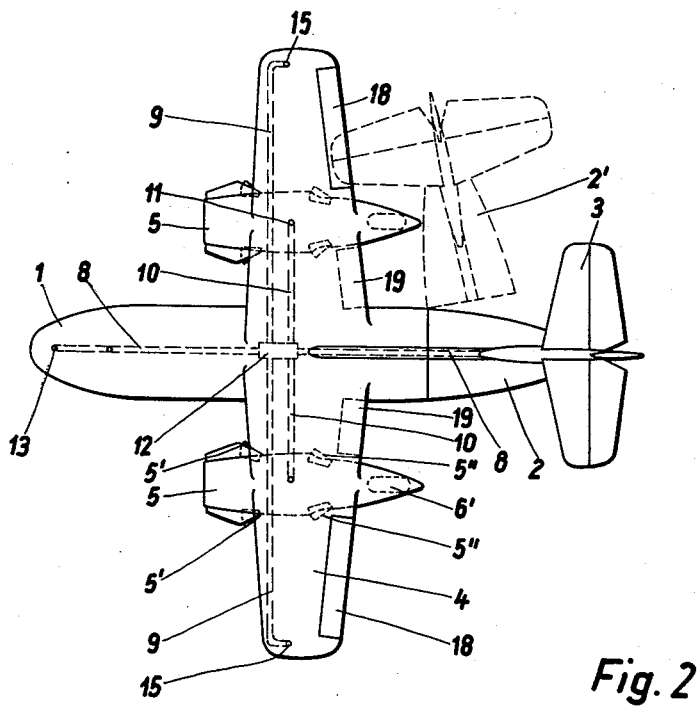
FIG. 2 is a plan view of the airplane shown in FIG. 1.
Figure 3:
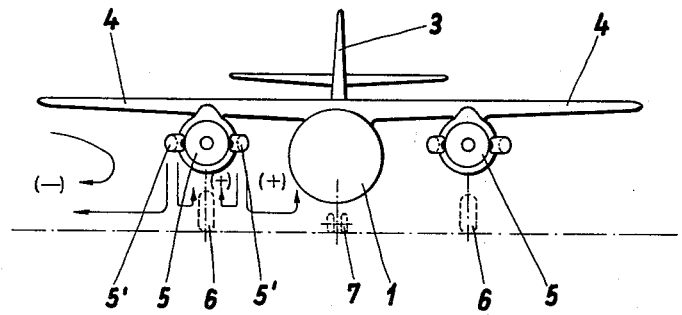
FIG. 3 is a schematic front elevation of the airplane shown in FIGS. 1 and 2.
Figure 4:
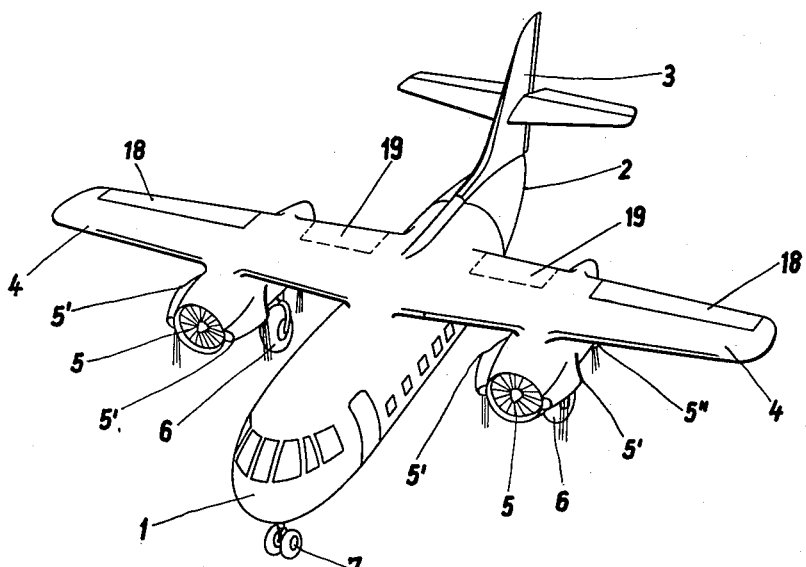
FIG. 4 is a perspective view of an airplane according to FIGS. 1 to 3.

The airplane shown in FIGS. 1 to 3 is of the high-mid-wing monoplane type, a fuselage 1 beneath the wings 4 being fully available and easily accessible for receiving crew and load. Jet power engines are located in two nacelles 5 below substantially the middle of the wings 4. An aileron 18 is provided on each wing outside of the power plant and a landing flap 19 is provided on each wing inside of the power plant. The landing flaps are preferably in the form of split flaps. The jet power plants in the nacelles 5 are preferably of the two-stream type whereby the turbine and the compressor rotate in opposite directions to eliminate gyroscopic moments. Each engine has a pair of jet nozzles discharging the relatively cold stream and a pair of jet nozzles discharging the hot combustion gas stream. The nozzles of each pair are placed on opposite sides of the engine nacelle. The pairs of nozzles discharging one stream are designated by 5' and the pair of nozzles discharging the other stream are designated by 5''. The nozzles are tiltable so that the direction of the jets can be continuously changed through an angle of approximately 180°. The nozzles of the engines which are located on opposite sides of the fuselage are preferably interconnected for simultaneous tilting in the same direction. However, provisions are made for tilting the nozzles of one engine in opposite direction to the tilting of the nozzles of the opposite engine, for example, for producing steering moments.

By placing the engines approximately in the middle of the wings the positive ground effect produced by the downwardly directed jets beneath the inner portions of the wings and beneath the fuselage is counteracted by the negative ground effect developing beneath the wings outside of the power plants. Arrows and (+) and (−) signs in FIG. 3 show the different ground effects developing beneath the wings. A main landing gear 6 is retractable into the rear end portion of each engine nacelle and is shown in dotted lines in retracted position 6'. A bow landing gear 7 is also retractable and shown in dotted lines in retracted position 7'. For steering the airplane a conventional tail unit 3 is provided which is effective when the airplane is in normal high-speed forward flight. If the forward speed of the airplane is insufficient for steering, conventional auxiliary jet steering means are provided, including steering nozzles placed at the ends of the wings and/or of the fuselage. In this way manoeuvering of the airplane around all three axes of the airplane can be effected. Compressed air may be tapped at 11 from the jet engines and conducted to a distributor 12 wherefrom pipes 8 extend to jet steering nozzles 13 at the bow of the fuselage and 14 at the stern of the fuselage. Air pipes 9 connect the distributor 12 with jet steering nozzles 15 at the ends of the wings. This arrangement affords trimming by blowing tapped air at different rates out of the steering nozzles 13 and 14. When the airplane is hovering steering is exclusively effected by jet reaction. The aforedescribed jet steering system can be altered in many ways. For example, the steering nozzle at the bow of the fuselage may be omitted if the nozzle at the stern is so designed that it can discharge downward or upward for turning the aircraft on its transverse axis.

Steering arrangements may be provided whereby turning on the transverse axis is effected by tapped air, and turning around the longitudinal axis and the vertical axis of the aircraft is effected by variation of the thrust vector, i.e., by adjustment of the position of the jet nozzles of the jet engines. The nozzles of the engines on opposite sides of the fuselage are tilted in opposite directions so that the jets are effective in opposite directions. The jets of different engines may be differently throttled so that the thrust produced on one side of the airplane is different from that produced on the other side of the airplane and the thrust becomes asymmetric. In order to obtain the correct combination for steering by controlling the speed of rotation of the individual engines and the position of the jet nozzles, an automatic control is preferably provided which computes the required change of the throttling effect and the required change of the position of the jet nozzles, when at the transition from hovering to normal flight the jet nozzles direct the jets in inclined direction forward and downward or in inclined direction rearward and downward. After computing the required change of the throttle effect and of the position of the jet nozzles the automatic control effects the corresponding thrust control at the engines and the required tilting of the jet nozzles. The automatic jet steering control is preferably combined with the control for the conventional tail unit so that the pilot manipulates only one control in the conventional manner.

Figure 5:
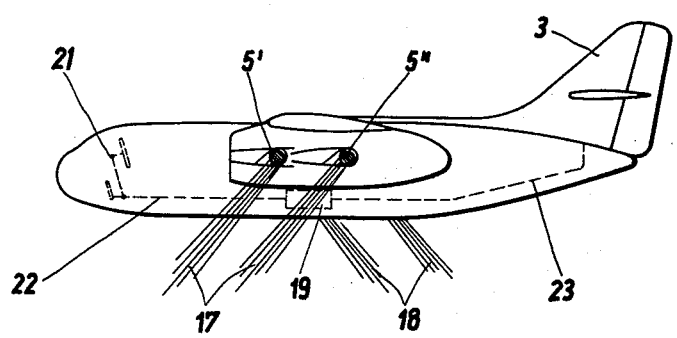
FIG. 5 is a schematic side elevation of an airplane according to the invention with the jet nozzles in position for vertical take-off, the figure diagrammatically showing control apparatus.
Figure 6:
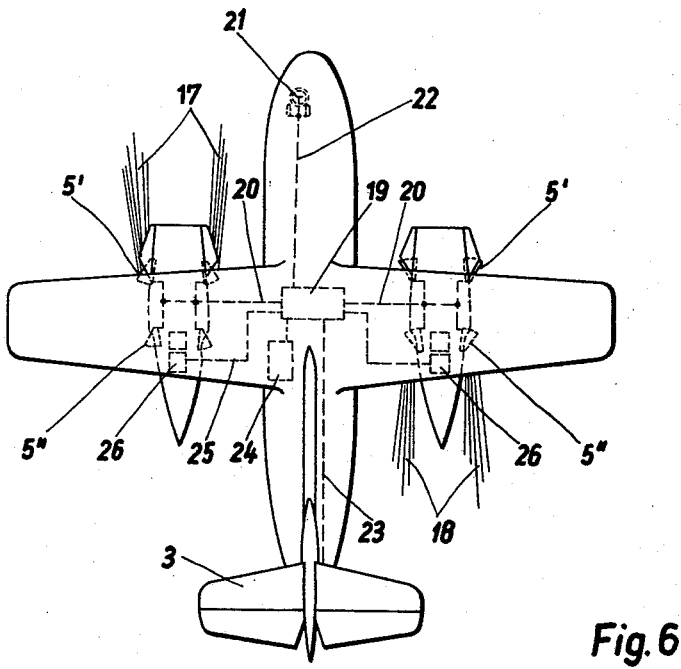
FIG. 6 is a plan view of the airplane shown in FIG. 5, diagrammatically showing control apparatus.

FIGS. 5 and 6 diagrammatically show a control arrangement of the type described in the paragraph next above. The jet nozzles 5' and 5" of the engine at the left side of the fuselage are directed forward and downward. The jets emerging from the engine at the right side of the fuselage are directed rearward and downward. The jets 27 of the left engine and 28 of the right engine are slanted in the opposite direction. With the position of the jet nozzles indicated in FIGS. 5 and 6 the airplane makes a left turn around its vertical axis.

Numeral 29 designates an automatic control apparatus which effects the desired tilting of the jet nozzles 5' and 5" of each power plant by conducting control signals from the apparatus 29 through conduits 20 to the actuators for tilting the nozzles. At the same time, if desired, apparatus 26, for example throttles, for regulating the engines may be controlled by signals conducted from the apparatus 29 through conduits 25 to the actuators for controlling the apparatus 26. A conventional control apparatus including a hand wheel 21 and pedals 21' for actuation by the pilot is connected to the apparatus 29 by a suitable conventional linkage 22. Numeral 23 designates a conventional linkage connecting the apparatus 29 with the tail unit.

For forward take-off the jet nozzle pairs 5' and 5" of both engines are rearwardly directed as shown in FIGS. 1 and 2. By tilting the nozzles downward and rearward the take-off run may be shortened. A vertical take-off is possible by tilting the nozzles to discharge in downward direction. The engines are so designed as to produce the required thrust for vertical take-off. The engines are preferably rigidly connected to the wings and only the nozzles are continuously tiltable, i.e. are not tilted stepwise so that any desired jet direction can be obtained. Since the airplane is of the high-wing type the engines are far above the ground and damage of the runways by the air or gas discharged from the nozzles is avoided. The thrust resultant of the jets of each engine extends through or very close to the lateral axis 38 of the airplane at all operative directions of the jets.

In order to avoid difficulties due to unsymmetric thrust irregularities in the operation of or failure of the engines must be eliminated or counteracted. Essential control elements must be provided in duplicate. The engines are preferably so controlled that at reduced output of one engine the output or thrust produced by the opposite engine is reduced likewise for holding the airplane in balanced position. This balancing method, of course, can be used only as long as the reduced outputs of the engines satisfy the flight requirements. The control of the equilibrium may be effected in response to conventional monitoring means which, for example, measure the thrust produced by the individual engines, or in response to gyroscopically stabilized instruments which react to changes of the attitude of the airplane caused by unsymmetrical thrust. Numeral 24 in FIG. 6 designates such a computer or monitoring means. It controls the regulating apparatus 26 of the jet engines either through the automatic control apparatus 29, as shown in FIG. 6, or directly. For safety reasons two like control apparatus 26 are provided on each engine.

As shown in FIG. 2, the stern portion 2 of the fuselage is laterally swingably connected to the main portion of the fuselage, the swung-out portion 2' being shown by dotted lines. In the airplane according to the invention the fuselage is fully available for receiving load which is conveniently received or unloaded at the stern of the fuselage. Openings for dropping load or parachutists may be provided which are closed by floor doors 36 swingable rearward and upward. Below the doors or hatches 36 flaps 37 are provided for closing adjacent openings in the wall of the stern portion of the fuselage.

Since the airplane according to the invention has the same attitude of flight during vertical take-off as during horizontal start and normal flight, it is well suited for transporting passengers and cargo. An additional advantage of the airplane according to the invention is its capacity of carrying a considerably greater load when starting horizontally, since its power plant is big enough to perform a vertical take-off.

Due to the arrangement of the engines according to the invention the pilot is not misled as to the available thrust when the airplane is close to the ground and when it rises vertically. The automatic control of the engines increases safety.

I claim:

1. An airplane suitable for vertical and horizontal take-off, comprising, in combination:

a fuselage, wings mounted to substantially the center of the upper portion of the fuselage and extending laterally thereof, a jet engine connected substantially to the center of each of said wings, each of said jet engines having a plurality of nozzles for discharging thrust producing gas jets, all nozzles of each engine having constant flow areas and being placed at the sides of said engines, and means for tilting said nozzles for continuously varying the directions of the gas jets issuing from said nozzles between a vertical downward direction and a horizontal direction, the resultant of the thrust producing gas jets of each of said engines at any position of said nozzles extending substantially through the axis of gravity which is parallel to the transverse axis of the airplane.

2. An airplane suitable for vertical and horizontal take-off, comprising, in combination:

a fuselage, wings mounted to substantially the center of the upper portion of the fuselage and extending laterally thereof, a jet engine placed substantially in the middle of the span of each wing, and a plurality of nozzles for producing gas jets placed on each side of each of said engines, all nozzles of each engine having a constant flow area and being tiltable for continuously varying the direction of the gas jets issuing from said nozzles between a vertical downward and a horizontal direction, the resultant of the thrust producing gas jets of each of said engines at any position of said nozzles extending substantially through the axis of gravity which is parallel to the transverse axis of the airplane.

3. An airplane suitable for vertical and horizontal take-off, comprising, in combination:

a fuselage, wings mounted to substantially the center of the upper portion of the fuselage and extending laterally thereof, and a jet engine placed substantially in the middle of the span of each wing, each of said engines having at least one nozzle for discharging a thrust producing gas jet, all said nozzles being placed at the sides of said engines and having a constant flow area and being tiltable for continuously varying the direction of the gas jets issuing from said nozzles between a vertical downward and a horizontal direction, the resultant of the thrust producing gas jets of each of said engines at any position of said nozzles extending substantially through the axis of gravity which is parallel to the transverse axis of the airplane.

4. An airplane as defined in claim 3 wherein said nozzles are tiltable through an angle of substantially 180°.

5. An airplane as defined in claim 3 including means operatively interconnecting the nozzle of the engine on one side of the fuselage and the nozzle of the engine on the opposite side of the fuselage for simultaneously tilting the nozzles of both engines.

6. An airplane as defined in claim 5 wherein said means operatively interconnecting the nozzles is operable to tilt the nozzles of both engines in the same direction.

7. An airplane as defined in claim 5 wherein said means operatively interconnecting the nozzles is operable to tilt the nozzles of both engines in opposite directions.

References Cited in the file of this patent

UNITED STATES PATENTS

| | | |
|---|---|---|
| 2,512,794 | Goddard | June 27, 1960 |
| 2,968,452 | Cook | Jan. 17, 1961 |
| 3,056,258 | Marchant | Oct. 2, 1962 |
| 3,061,241 | Holland | Oct. 30, 1962 |